2,995,593
HEXAALKOXYDISILOXANES

Steve A. Kovacich, El Cerrito, and Robert L. Peeler, Albany, Calif., assignors to California Research Corporation, San Francisco, Calif., a corporation of Delaware
No Drawing. Filed June 30, 1958, Ser. No. 745,333
5 Claims. (Cl. 260—448.8)

This invention relates to novel hexaalkoxydisiloxanes. More particularly, the invention is concerned with a novel class of dialkoxytetratertiaryalkoxydisiloxanes having improved properties.

Hexaalkoxydisiloxanes are generally characterized by unusually good viscosity-temperature properties, superior lubricity, and low volatility which make them attractive as high-temperature hydraulic fluids and lubricants. A great many of the hexaalkoxydisiloxanes, however, are unstable, particularly at high temperatures and in the presence of water. This instability makes them objectionable for a number of important uses.

We have now discovered a novel class of hexaalkoxydisiloxanes having improved properties, namely, the dialkoxytetratertiaryalkoxydisiloxanes, wherein the alkoxy groups contain from 3 to 13 carbon atoms each, and the tertiary alkoxy groups contain from 4 to 8 carbon atoms each.

The hexaalkoxydisiloxanes of the present invention possess outstanding properties which are considered desirable for hydraulic fluids and lubricants. Their hydrolytic stability, particularly at high temperatures, is excellent. They are also low in volatility and have excellent viscosity-temperature properties which permit their effective use over a wide range of temperatures.

The dialkoxytetratertiaryalkoxydisiloxanes of the invention are illustrated by the structural formula:

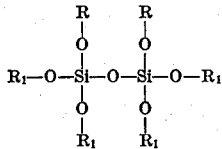

wherein the R's, which may be the same or different from one another, are primary or secondary alkyl groups of from 3 to 13 carbon atoms each, and the $R_1$'s, which may be the same or different from one another, are tertiary-alkyl groups of from 4 to 8 carbon atoms each. Preferably, the R's are primary or secondary alkyl groups of 3 to 10 carbon atoms, and the $R_1$'s are tertiaryalkyl groups of from 4 to 6 carbon atoms. Such preferred alkyl groups provide dialkoxytetratertiaryalkoxydisiloxanes which are unusually stable at high temperatures and in the presence of water.

Dialkoxytetratertiaryalkoxydisiloxanes illustrative of the invention as described above include:

1,1,3,3-tetra(tert-butoxy)-1,3-di(2-ethyl-butoxy)disiloxane
1,1,3,3-tetra(tert-pentoxy)-1,3-di(2-ethyl-butoxy)disiloxane
1,1,3,3-tetra(tert-pentoxy)-1,3-di(2-octoxy)disiloxane
1,1,3,3-tetra(tert-butoxy)-1,3-di(5-ethyl-2-nonoxy)disiloxane The hexaalkoxydisiloxanes are generally prepared by several different methods. According to one conventional method, one mol of a silicon tetrahalide, such as silicon tetrachloride, is reacted with 3 mols of alcohol in the presence of an acid acceptor, such as alpha-picoline or pyridine, to give trialkoxychlorosilane. Two mols of the trialkoxychlorosilane are reacted with one mol of water in the presence of an acid acceptor to give hexaalkoxydisiloxane.

Although the above method is generally satisfactory in the preparation of ordinary hexaalkoxydisiloxanes, it has been found useless for the production of the hexaalkoxydisiloxanes of the present invention which are characterized by the presence of 4 tertiary alkoxy groups. The alkoxyditertiaryalkoxychlorosilane intermediates, for some reason, will not react with each other to give the disiloxane even though the most stringent reaction conditions are employed.

Therefore, in the preparation of the dialkoxytetratertiaryalkoxydisiloxanes of the invention, a novel process is employed to a definite advantage. This process comprises reacting 1 mol of an alkoxyditertiaryalkoxysilanol with one mol of metallic sodium to obtain the sodium salt, or sodium silanolate, of the silanol. The alkoxyditertiaryalkoxysilanol is obtained by reacting alkoxyditertiaryalkoxychlorosilane with water in the presence of an acid acceptor, such as alpha-picoline or pyridine. One mol of the sodium salt of the alkoxyditertiaryalkoxysilanol is then reacted with one mol of alkoxyditertiaryalkoxymonochlorosilane to give the desired dialkoxytetratertiaryalkoxydisiloxane and sodium chloride by-product. The reaction is conveniently carried out in the presence of a solvent, such as toluene, and heating is used to accelerate the final stages of the reaction. Excellent yields are obtained.

The following examples are given as additional illustrations of the preparation of the novel dialkoxytetratertiaryalkoxydisiloxanes of the invention. Unless otherwise specified, proportions are given on a weight basis.

EXAMPLE 1

394 grams di(tertiarybutoxy)dichlorosilane (prepared by the reaction of silicon tetrachloride and tertiary butyl alcohol in the presence of excess alpha-picoline) with 161 ml. toluene and 175 grams alpha-picoline were added to a 2-liter reaction flask. 164 grams 2-ethylbutanol were added gradually, keeping the temperature between 12° C. and 34° C. The mixture was then refluxed overnight. After cooling and decanting from the solid alpha-picoline·HCl, the product was distilled through a spinning band column, the fraction boiling between 55° C. and 59° C. at 1 mm. was collected as di(tertiarybutoxy)-2-ethylbutoxychlorosilane.

95 grams of di(tertiarybutoxy)-2-ethylbutoxychlorosilane was mixed with 34 ml. alpha-picoline and 31 ml. toluene. 15.3 ml. of water was added slowly and the mixture heated four hours at 100° C. On cooling, the liquid separated into two phases. The upper was separated, stripped of remaining toluene and alpha-picoline at 65° C. at 1 mm. pressure. The bottoms remaining was crude di(tertiarybutoxy)-2-ethylbutoxysilanol. It was reacted with 10.65 grams sodium in the presence of 50 ml. toluene. The mixture was held at 100° C. until visible reaction ceased. 95 grams of di(tertiarybutoxy)-2-ethylbutoxychlorosilane was added to the reaction mixture, which was then held at 100 to 115° C. for 16 hours. After cooling to room temperature, 50 ml. alpha-picoline and 100 ml. water were added. After stirring and separation of the two layers, the upper layer was washed twice with water and centrifuged to separate residual water. It was distilled through a spinning band column, the fraction boiling between 158° C. and 162° C. at 1 mm. being collected as 1,1,3,3-tetratertiarybutoxy-1,3-di(2-ethylbutoxy)disiloxane.

Additional examples of the dialkoxytetratertiaryalkoxydisiloxanes according to the invention and related materials for the purpose of comparison were prepared, employing the procedures as outlined above. The properties of the dialkoxytetratertiaryalkoxydisiloxanes are summarized in the following table: such fluids or the formation of insolubles is unsatisfactorily high in each instance.

Table I

| Example No. | Compound | Boiling point, °C./mm. | Viscosity, cs. | | ASTM slope, 100/210° F. | Silicon, percent | | Carbon, percent | | Hydrogen, percent | |
|---|---|---|---|---|---|---|---|---|---|---|---|
| | | | 100° F. | 210° F. | | Found | Calc. | Found | Calc. | Found | Calc. |
| 1 | 1,1,3,3-tetra(tertiarybutoxy)-1,3-di(2-ethylbutoxy)disiloxane. | 158–162/1 | ¹ 2.060 | 4.879 | ² 0.77 | | | 59.76 | 59.32 | 10.66 | 11.02 |
| 2 | 1,1,3,3-tetra(tertiarypentoxy)-1,3-di(2-ethylbutoxy)disiloxane. | 176–190/0.2 | ¹ 3.266 | ³ 1.716 | ⁴ 0.75 | 9.11 | 9.02 | | | | |
| 3 | Hexa(2,2-dimethylbutoxy)-disiloxanes | | | | | 8.48 | 8.28 | 62.11 | 63.67 | 10.93 | 11.59 |
| 4 | 1,3-di(tertiarybutoxy)-1,1,3,3-tetra(2-ethylbutoxy)disiloxane. | 179–183/1 | 11.43 | 3.715 | 0.58 | 8.85 | 9.02 | 61.72 | 61.59 | 11.24 | 11.32 |
| 5 | 1,1,1-tri(tertiarybutoxy)-3,3,3-tri(2-ethylbutoxy)-disiloxane. | 163–165/1 | 13.26 | 3.916 | 0.61 | 9.11 | 9.44 | 60.93 | 60.56 | 11.44 | 11.18 |

¹ At 312° F.
² From 210° F. to 312° F.
³ At 415° F.
⁴ From 312° F. to 415° F.

In the above examples, the hexaalkoxydisiloxane, the ditertiaryalkoxytetraalkoxydisiloxane, and the tritertiaryalkoxytrialkoxydisiloxane are included for the purpose of comparative evaluation.

A series of tests was carried out to illustrate the superior properties of the novel dialkoxytetratertiaryalkoxydisiloxanes of the invention. These tests show excellent hydrolytic stability at elevated temperatures compared to other alkoxydisiloxanes of the same general type. In the tests 10.00 ml. of the dialkoxytetratertiaryalkoxydisiloxane and 0.60 ml. of water are placed in a 22 ml. nickel bomb. The bomb is closed and rotated at 5 r.p.m. in an oven maintained at 400° F. At the end of the 20 hours the bomb is removed from the oven. The test fluid is taken from the bomb and centrifuged. Following centrifugation the liquid portion is decanted for viscosity measurements. Insolubles remaining after decanting are washed with chloroform, dried, and weighed.

The results of the 20-hour test on the alkoxydisiloxanes of the invention are given in the following table. For comparison, test results are also included in the table showing the hydrolytic stability of other types of alkoxydisiloxanes.

Table II

| Compound | Viscosity changes, percent at— | | Insolubles, percent |
|---|---|---|---|
| | 100° F. | 210° F. | |
| 1,1,3,3-tetra(tertiarybutoxy)-1,3-di(2-ethylbutoxy)disiloxane | | −11.1 | 0.07 |
| 1,1,3,3-tetra(tertiarypentoxy)-1,3-di(2-ethylbutoxy)disiloxane | | ¹ +0.7 | 0.13 |
| Hexa(2-ethylbutoxy)-disiloxane | | −51.4 | 14.1 |
| Hexa(2,2-dimethylbutoxy)-disiloxane | | | 8.53 |
| Hexa(2-octoxy)disiloxane | | −61.3 | 9.54 |
| 1,3-di(tertiarybutoxy)-1,1,3,3-tetra(2-ethylbutoxy)disiloxane | −44.1 | −43.1 | 3.83 |
| 1,1,1-tri(tertiarybutoxy)-3,3,3-tri(2-ethylbutoxy)-disiloxane | −55.2 | −62.1 | 10.14 |

¹ At 312° F.

From the above test results, it will be seen that the dialkoxytetratertiaryalkoxydisiloxanes of the present invention are quite stable to hydrolysis at high temperatures. There is very little change in the viscosity of the fluids after prolonged heating at 400° F. in the presence of water. Furthermore, there is very little formation of insolubles. By way of contrast, ordinary hexaalkoxydisiloxanes and disiloxanes containing as many as 3 tertiary alkoxy groups are shown to be much less stable. Undesirably large changes in viscosity are sustained with such fluids or the formation of insolubles is unsatisfactorily high in each instance.

The unusual stability of the dialkoxytetratertiaryalkoxydisiloxanes according to the present invention makes them particularly valuable as hydraulic fluids and lubricants in applications where high temperatures are encountered. The fact that they maintain excellent viscosity-temperature properties is especially important, since minimum viscosity changes throughout wide temperature ranges are required. Resistance to the formation of solid particles of silica is also critical, since such abrasive materials obviously interfere with the functioning of hydraulic and lubrication systems.

We claim:

1. Dialkoxytetratertiaryalkoxydisiloxane having the general structural formula:

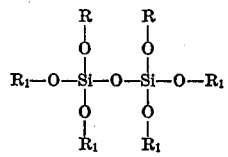

wherein the R's are selected from the group consisting of primary and secondary alkyl groups of from 3 to 10 carbon atoms each, and the $R_1$'s are tertiary alkyl groups of from 4 to 6 carbon atoms each.

2. 1,1,3,3 - tetra(tertiarybutoxy)-1,3-di(2-ethylbutoxy)disiloxane.

3. 1,1,3,3-tetra(tert-pentoxy) - 1,3 - di(2-ethylbutoxy)disiloxane.

4. 1,1,3,3 - tetra(tert - pentoxy) - 1,3 - di(2 - octoxy)disiloxane.

5. 1,1,3,3 - tetra(tert-butoxy)-1,3-di(5-ethyl-2-nonoxy)disiloxane.

References Cited in the file of this patent

UNITED STATES PATENTS

| | | |
|---|---|---|
| 2,566,365 | Pedlow | Sept. 4, 1951 |
| 2,717,242 | Foehr | Sept. 6, 1955 |
| 2,758,126 | Goldschmidt et al. | Aug. 7, 1956 |
| 2,758,127 | Goldschmidt et al. | Aug. 7, 1956 |

FOREIGN PATENTS

| | | |
|---|---|---|
| 703,420 | Great Britain | Feb. 3, 1954 |

OTHER REFERENCES

Backer et al.: "Rec. Trav. Chim. des Pays-Bas," vol. 61, pp. 500–12 (1942).

Peeler et al.: "Ind. & Eng. Chem.," vol. 51, pp. 749–52, June 1959.